United States Patent
Amores et al.

(10) Patent No.: US 12,282,883 B2
(45) Date of Patent: Apr. 22, 2025

(54) ROBUST FAULT DETECTION AND DIAGNOSIS BY CONSTRUCTING AN ENSEMBLE OF DETECTORS

(71) Applicant: Johnson Controls Technology Company, Auburn Hills, MI (US)

(72) Inventors: Jaume Amores, Cork (IE); Young M. Lee, Old Westbury, NY (US); Sugumar Murugesan, Santa Clara, CA (US); Steven R. Vitullo, Milwaukee, WI (US)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 461 days.

(21) Appl. No.: 16/725,644

(22) Filed: Dec. 23, 2019

(65) Prior Publication Data

US 2021/0191378 A1    Jun. 24, 2021

(51) Int. Cl.
*G06Q 10/08*    (2024.01)
*G06F 16/11*    (2019.01)

(52) U.S. Cl.
CPC ............. *G06Q 10/08* (2013.01); *G06F 16/11* (2019.01)

(58) Field of Classification Search
CPC ......... G06F 11/07; G06F 11/00; G06Q 10/08; G06N 20/00; G06N 7/01; G05B 23/0229; G05B 23/0275; G05B 23/0283; G05B 13/04; G05B 23/0221
See application file for complete search history.

(56) References Cited

U.S. PATENT DOCUMENTS

| | | | | |
|---|---|---|---|---|
| 8,711,711 B2* | 4/2014 | Kim | ................. | H04L 25/0268 |
| | | | | 370/242 |
| 9,429,927 B2* | 8/2016 | Nesler | .................... | G05B 15/02 |
| 9,753,455 B2* | 9/2017 | Drees | .................... | G06Q 10/06 |
| 9,778,639 B2* | 10/2017 | Boettcher | ............ | G05B 19/042 |
| 10,031,796 B1* | 7/2018 | Havemose | ............ | G06F 11/079 |
| 10,191,796 B1* | 1/2019 | Havemose | ............ | G06F 11/076 |
| 10,739,741 B2* | 8/2020 | Wenzel | ............. | H02J 13/00016 |
| 11,455,560 B2* | 9/2022 | Spiro | ...................... | G06F 30/20 |
| 11,500,365 B2* | 11/2022 | Yarmus | ............. | G05B 23/0221 |
| 11,892,940 B2* | 2/2024 | Ahmed | ................. | G06F 11/366 |
| 2004/0002776 A1* | 1/2004 | Bickford | ............ | G05B 23/0254 |
| | | | | 700/52 |
| 2005/0132253 A1* | 6/2005 | Gail | ................... | G06F 11/0709 |
| | | | | 714/25 |
| 2009/0043405 A1* | 2/2009 | Chester | ............. | G05B 23/0254 |
| | | | | 700/51 |

(Continued)

OTHER PUBLICATIONS

Bishop, C. Pattern, Recognition and Machine Learning. Springer Science+Business Media, LLC. 2006, 758 pages, Printed in Singapore.

*Primary Examiner* — Florian M Zeender
*Assistant Examiner* — Milena Racic
(74) *Attorney, Agent, or Firm* — Foley & Lardner LLP

(57) ABSTRACT

A method of generating a fault determination in a building management system (BMS), the method including receiving signal data, generating, using a number of fault detection models, a number of fault indications based on the signal data, generating, using a weighting function, based on the number of fault indications, a fault score, comparing the fault score to a fault value, and determining, based on the comparison, an existence of a fault.

28 Claims, 10 Drawing Sheets

(56) References Cited

U.S. PATENT DOCUMENTS

| | | | | |
|---|---|---|---|---|
| 2011/0047418 | A1* | 2/2011 | Drees | G05B 23/00 |
| | | | | 714/57 |
| 2014/0142760 | A1* | 5/2014 | Drees | H02J 13/00016 |
| | | | | 700/275 |
| 2014/0245071 | A1* | 8/2014 | Drees | H02J 13/00002 |
| | | | | 714/39 |
| 2016/0041070 | A1* | 2/2016 | Wascat | G01M 7/00 |
| | | | | 702/183 |
| 2016/0203036 | A1* | 7/2016 | Mezic | G06N 7/005 |
| | | | | 714/819 |
| 2017/0286204 | A1* | 10/2017 | Dibowski | G06F 11/0751 |
| 2020/0233391 | A1* | 7/2020 | Ma | G06Q 10/10 |
| 2024/0413455 | A1* | 12/2024 | McBride | H01M 10/657 |

* cited by examiner

ROBUST FAULT DETECTION AND DIAGNOSIS BY CONSTRUCTING AN ENSEMBLE OF DETECTORS

BACKGROUND

A building management system (BMS) is, in general, a system of devices configured to control, monitor, and manage equipment in or around a building or building area. A BMS may include a controller, a heating, ventilation, and air conditioning (HVAC) system, a security system, a lighting system, a fire alerting system, and any other system that is capable of managing building functions or devices, or any combination thereof. A BMS may include a variety of devices (e.g., HVAC devices, controllers, chillers, fans, sensors, etc.) configured to facilitate monitoring and controlling the building space. Devices may be configured to communicate with other devices via a network, such as a Building Automation and Control network (BACnet) or a Multi-service Transport Platform (MSTP) Network.

A BMS may include a fault detection and diagnosis (FDD) system to generate notifications based on detected anomalies. For example, a FDD system may sound a fire alarm in response to detecting a high level of smoke. As a further example, a FDD system may display a fault to a BMS operator in response to detecting a malfunctioning HVAC component (e.g., a stalled air compressor, etc.). The FDD system may monitor the BMS (e.g., the observed system) and generate fault notifications for display to a BMS operator based on anomalies detected in the BMS.

SUMMARY

One embodiment of the disclosure relates to a method of generating a fault determination in a building management system (BMS), the method including receiving signal data, generating, using a number of fault detection models, a number of fault indications based on the signal data, generating, using a weighting function, based on the number of fault indications, a fault score, comparing the fault score to a fault value, and determining, based on the comparison, an existence of a fault.

In some embodiments, the fault score indicates a level of confidence that the fault exists. In some embodiments, the fault score indicates the probability that a parameter of the building management system (BMS) has a specific value. In some embodiments, generating the fault score further includes generating a fault confidence based on the number of fault indications, wherein the fault confidence indicates a level of confidence that the fault exists. In some embodiments, generating the number of fault indications further includes generating, by each of the number of fault detection models, an individual fault confidence based on the signal data. In some embodiments, generating the fault confidence includes applying a second weighting function to the number of individual fault confidences based on the probability that the parameter of the building management system (BMS) has the specific value. In some embodiments, the signal data is timeseries data. In some embodiments, the method further includes, in response to determining the existence of the fault, sending an indication of the fault to a building management (BMS) operator. In some embodiments, a first subset of one or more of the number of fault detection models is associated with detecting a first type of fault and a second subset of one or more of the number of fault detection models is associated with detecting a second type of fault. In some embodiments, generating the number of fault indications comprises generating, by the first subset of fault detection models, a first fault indication of the number of fault indications using a first subset of the signal data associated with a first component of the BMS and generating, by the second subset of fault detection models, a second fault indication of the number of fault indications using a second subset of the signal data associated with a second component of the BMS.

Another embodiment of the disclosure relates to a building management system (BMS), including a processing circuit including a processor and memory, the memory having instructions stored thereon that, when executed by the processor, cause the processing circuit to receive signal data, generate, using a number of fault detection models, a number of fault indications based on the signal data, generate, using a weighting function, based on the number of fault indications, a fault score, compare the fault score to a fault value, and determine, based on the comparison, an existence of a fault.

In some embodiments, the fault score indicates a level of confidence that the fault exists. In some embodiments, the fault score indicates the probability that a parameter of the BMS has a specific value. In some embodiments, generating the fault score further includes generating a fault confidence based on the number of fault indications, wherein the fault confidence indicates a level of confidence that the fault exists. In some embodiments, generating the number of fault indications further includes generating, by each of the number of fault detection models, an individual fault confidence based on the signal data. In some embodiments, generating the fault confidence includes applying a second weighting function to the number of individual fault confidences based on the probability that the parameter of the BMS has the specific value. In some embodiments, the signal data is timeseries data. In some embodiments, the processing circuit further configured to, in response to determining the existence of the fault, send an indication of the fault to a BMS operator. In some embodiments, a first subset of the number of fault detection models is associated with detecting a first type of fault and a second subset of the number of fault detection models is associated with detecting a second type of fault. In some embodiments, generating the number of fault indications comprises generating, by the first subset of fault detection models, a first fault indication of the number of fault indications using a first subset of the signal data associated with a first component of the BMS and generating, by the second subset of fault detection models, a second fault indication of the number of fault indications using a second subset of the signal data associated with a second component of the BMS.

Another embodiment of the disclosure relates to a non-transitory computer-readable storage medium having instructions stored thereon that, when executed by a processor, cause the processor to receive signal data, generate, using a number of fault detection models, a number of fault indications based on the signal data, wherein a first subset of one or more of the number of fault detection models is associated with detecting a first type of fault and a second subset of one or more of the number of fault detection models is associated with detecting a second type of fault, wherein generating the number of fault indications comprises generating, by the first subset of fault detection models, a first fault indication of the number of fault indications using a first subset of the signal data associated with a first component and generating, by the second subset of fault detection models, a second fault indication of the number of fault indications using a second subset of the signal data associated with a second component, generate, using a weighting function, based on the number of fault indications, a fault score, compare the fault score to a fault value, and determine, based on the comparison, an existence of a fault.

In some embodiments, the fault score indicates a level of confidence that the fault exists. In some embodiments, the fault score indicates the probability that a parameter associated with a system including the first and second components has a specific value. In some embodiments, generating the fault score further includes generating a fault confidence based on the number of fault indications, wherein the fault confidence indicates a level of confidence that the fault exists. In some embodiments, generating the number of fault indications further includes generating, by each of the number of fault detection models, an individual fault confidence based on the signal data. In some embodiments, generating the fault confidence includes applying a second weighting function to the number of individual fault confidences based on the probability that the parameter of the system has the specific value. In some embodiments, the signal data is timeseries data. In some embodiments, the method further includes, in response to determining the existence of the fault, sending an indication of the fault to an operator associated with the system.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Disclosed herein is an improved fault detection and diagnosis (FDD) system including an ensemble of FDD models. The FDD system of the present disclosure may greatly increase the accuracy of fault determinations and provide improved robustness to individual parameter selection. In various embodiments, the FDD system of the present disclosure includes a superposition of FDD models and/or parameters. As a non-limiting example, the FDD system may include ten FDD models, each having a number of different parameters, and may develop a consensus from the fault determinations of the ten FDD models. In some embodiments, the FDD system of the present disclosure facilitates generation of fault confidences. The FDD system of the present disclosure may improve the functioning of computing systems and the field of fault detection generally by greatly improving the accuracy of fault determinations, reducing false fault determinations, improving fault integrity, reducing fault noise (e.g., alarm fatigue), and thereby conserving operator and system resources devoted to investigating fallacious faults.

Building HVAC Systems and Building Management Systems

Figure 1:
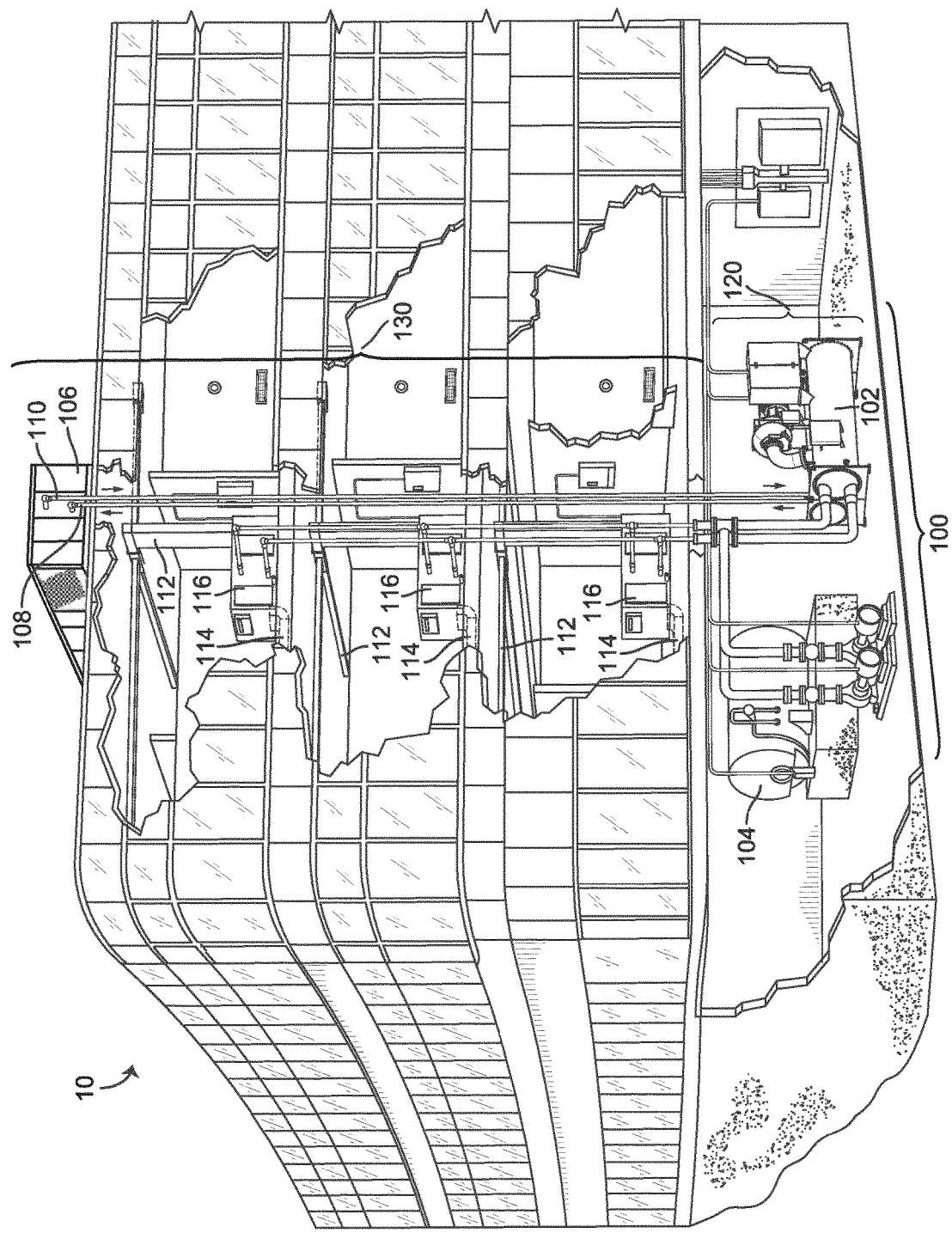
FIG. 1 is a drawing of a building equipped with a heating, ventilation, or air conditioning (HVAC) system, according to an exemplary embodiment.
Figure 2:
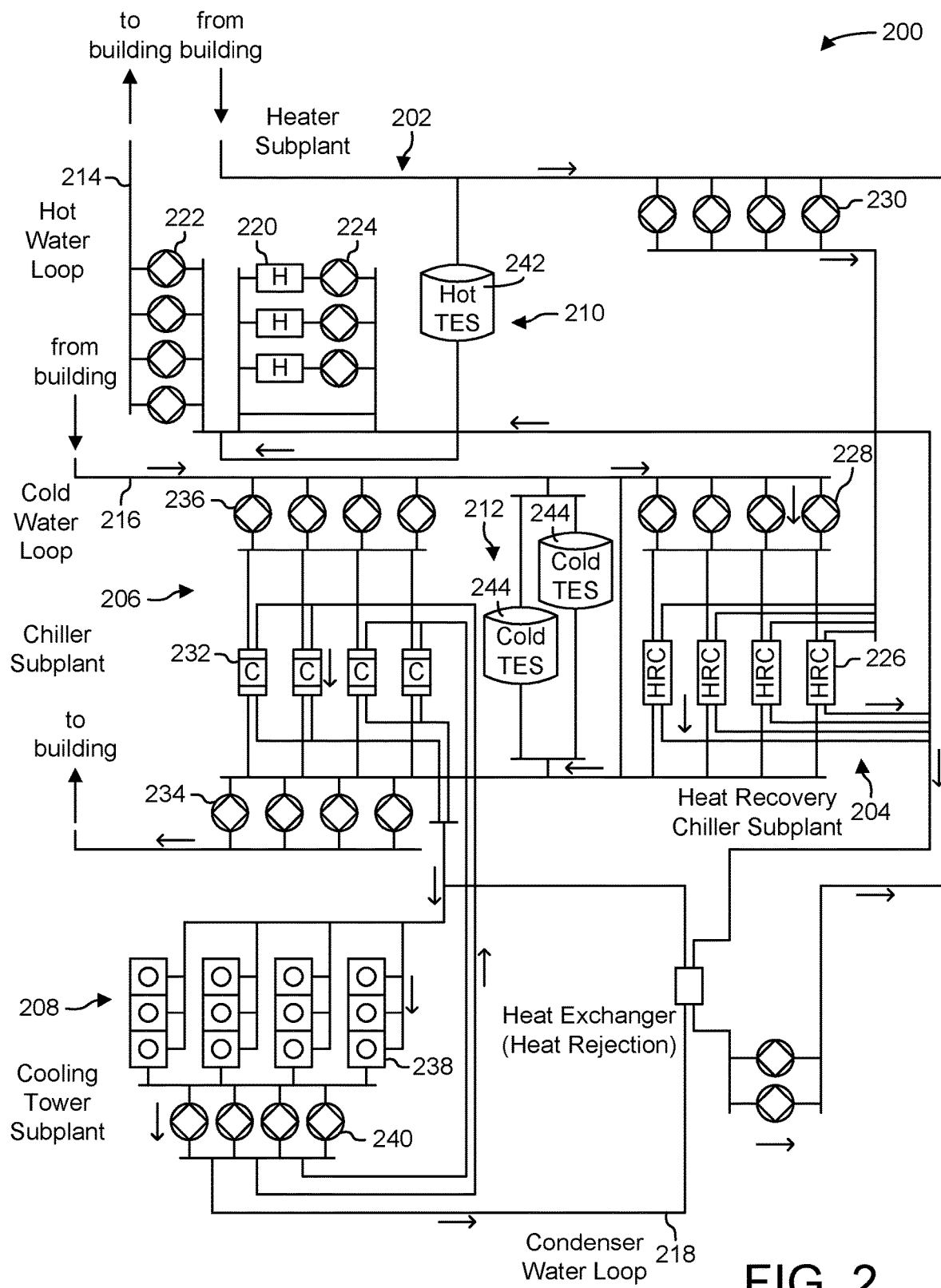
FIG. 2 is a drawing of a waterside system that can be used in combination with the HVAC system of FIG. 1, according to an exemplary embodiment.
Figure 3:
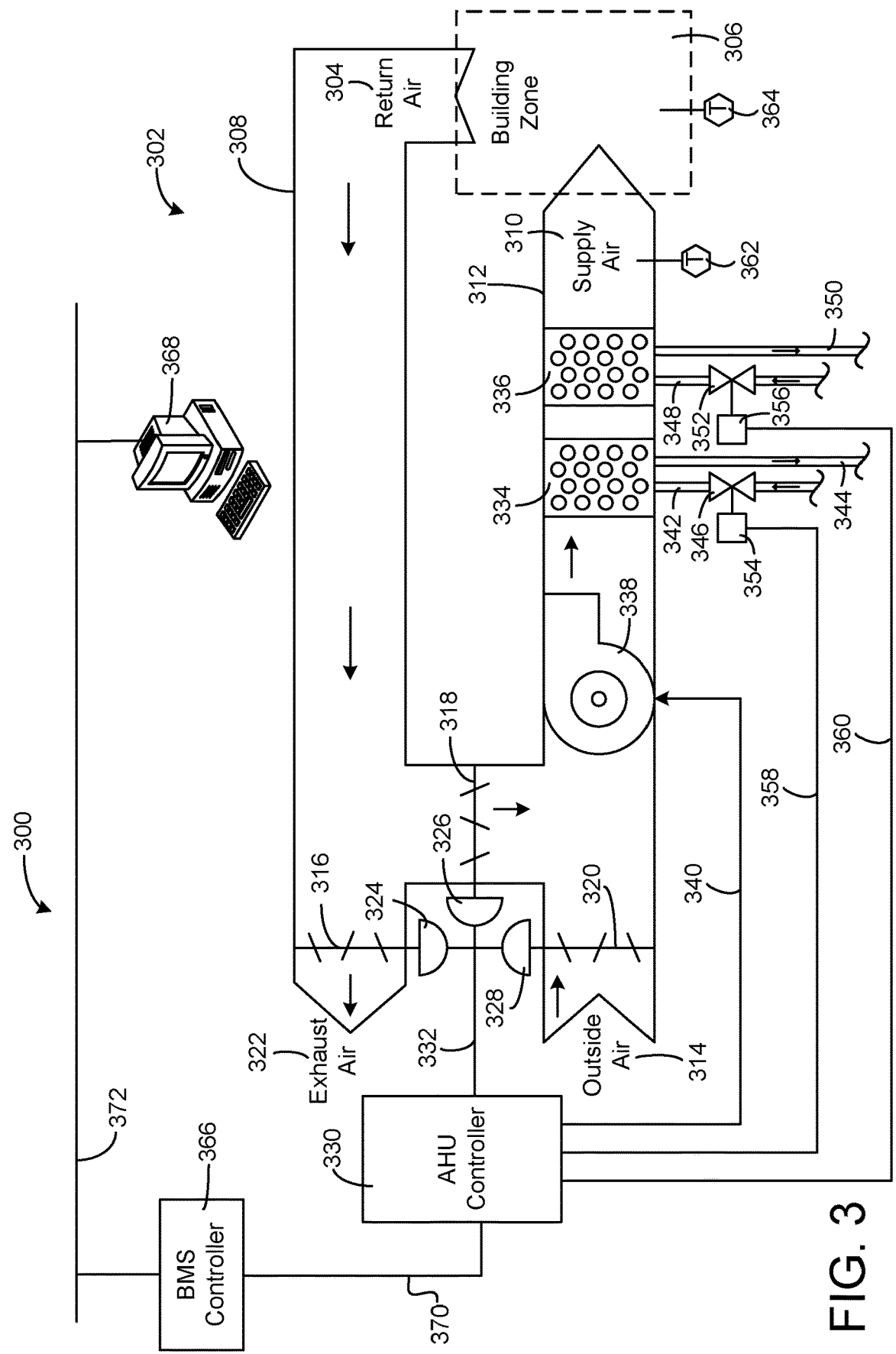
FIG. 3 is a drawing of an airside system that can be used in combination with the HVAC system of FIG. 1, according to an exemplary embodiment.
Figure 4:
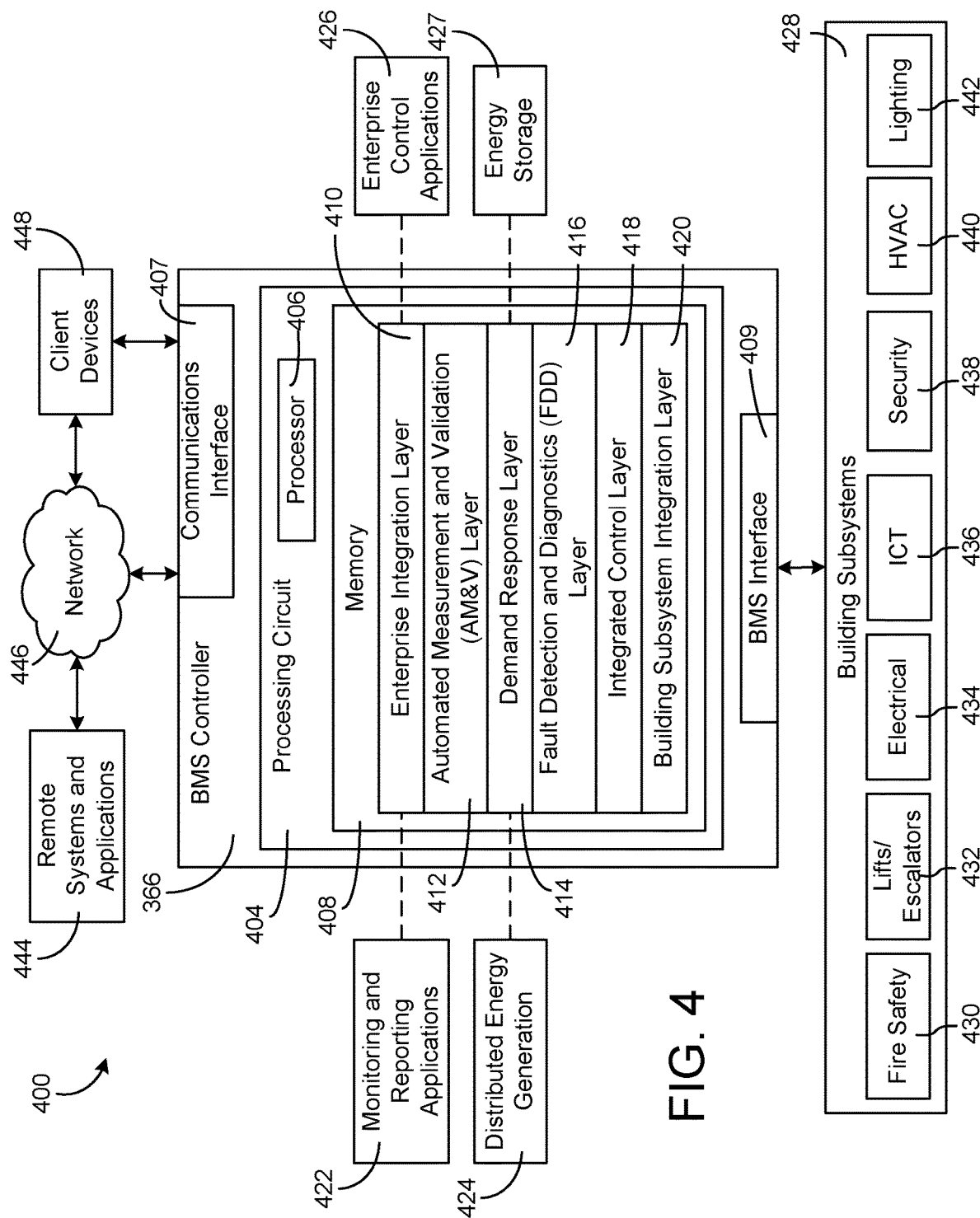
FIG. 4 is a block diagram of a building management system that can be used to monitor and control the building and HVAC system of FIG. 1, according to an exemplary embodiment.
Figure 5:
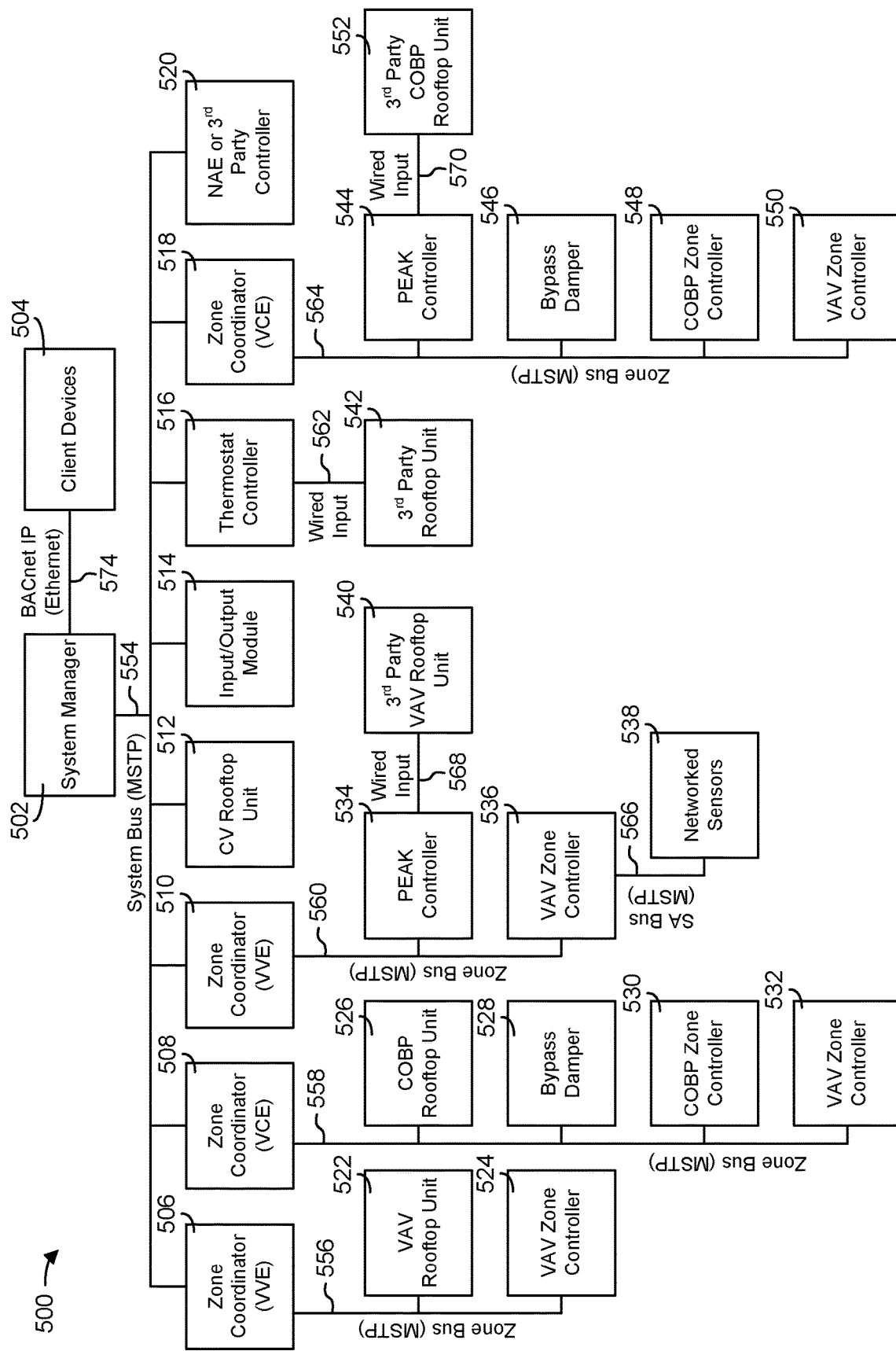
FIG. 5 is a block diagram of another building management system that can be used to monitor and control the building and HVAC system of FIG. 1, according to an exemplary embodiment.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106.

Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

In some embodiments, HVAC system 100 uses free cooling to cool the working fluid. For example, HVAC system 100 can include one or more cooling towers or heat exchangers which transfer heat from the working fluid to outside air. Free cooling can be used as an alternative or supplement to mechanical cooling via chiller 102 when the temperature of the outside air is below a threshold temperature. HVAC system 100 can switch between free cooling and mechanical cooling based on the current temperature of the outside air and/or the predicted future temperature of the outside air.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, waterside system 200 uses free cooling to cool the water in cold water loop 216. For example, the water returning from the building in cold water loop 216 can be delivered to cooling tower subplant 208 and through cooling towers 238. Cooling towers 238 can remove heat from the water in cold water loop 216 (e.g., by transferring the heat to outside air) to provide free cooling for the water in cold water loop 216. In some embodiments, waterside system 200 switches between free cooling with cooling tower subplant 208 and mechanical cooling with chiller subplant 208 based on the current temperature of the outside air and/or the predicted future temperature of the outside air.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

In some embodiments, AHU controller 330 uses free cooling to cool supply air 310. AHU controller 330 can switch between free cooling and mechanical cooling by operating outside air damper 320 and cooling coil 334. For example, AHU controller 330 can deactivate cooling coil 334 and open outside air damper 320 to allow outside air 314 to enter supply air duct 312 in response to a determination that free cooling is economically optimal. AHU controller 330 can determine whether free cooling is economically optimal based on the temperature of outside air 314 and/or the predicted future temperature of outside air 314. For example, AHU controller 330 can determine whether the temperature of outside air 314 is predicted to be below a threshold temperature for a predetermined amount of time.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control processes in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Fault Detection and Diagnosis System

Systems and methods of the present disclosure relate generally to fault detection and diagnosis (FDD). Specifically, described herein are systems and methods of FDD based on a number of FDD models in combination, e.g., that develop a fault consensus. In one non-limiting example embodiment, the FDD system includes an ensemble of FDD models that produce individual fault determinations that are collectively analyzed to determine a fault. In some embodiments, each of the FDD models is focused on detecting a different class of faults. For example, a first FDD model may focus on detecting faults related to a security system while a second FDD model may focus on detecting faults related to a HVAC system. Additionally or alternatively, each of the FDD models may analyze a different aspect of the observed system. For example, a first FDD model may analyze sensor data while a second FDD model may analyze aggregate data. In various embodiments, the FDD system may determine fault confidences. For example, the FDD system may generate a fault with an associated confidence of 80%. While the FDD system described herein is generally discussed as being implemented in a building management system (BMS), one of skill in the art will understand that the FDD system described herein may be applied to any system. For example, the FDD system described herein may be implemented in a computer network (e.g., a data-center, a cloud computing system, etc.) to determine faults associated with hardware functioning. As a further example, the FDD system described herein may be implemented in a closed-circuit television (CCTV) network to determine faults associated with video feeds. Additionally or alternatively, the FDD system described herein may be implemented on different levels. For example, a first FDD system may be implemented at a system level to receive HVAC control signals and determine faults associated with the functioning of the overall HVAC system, while a second FDD system may be implemented at a device/component level to receive signal data and determine faults associated with the functioning of the specific device/component. As a concrete example, the FDD system described herein may be implemented in a register-transfer level (RTL) based access door to determine faults related to the functioning of the access door.

Systems and methods of the present disclosure offer many benefits over existing systems. A FDD system may build a model characterizing an observed system (e.g., a BMS system, a security system, etc.). In various embodiments, the model represents a baseline of the observed system (e.g., a normal state of the system, etc.). The FDD system may compare data relating to the observed system to the model to determine anomalies (e.g., faults, alarms, etc.). For example, a FDD system may compare a sensor signal to a parameter value to determine if a fault exists. As a concrete example, a FDD system may compare a particulate measurement from an air quality sensor to a threshold value to determine if an air quality fault exists. Traditional FDD systems are sensitive to individual parameter values. To continue the previous example, an improperly high threshold value may cause the FDD system to generate a large number of false negatives and similarly an improperly low threshold value may cause the FDD system to generate a large number of false positives. Therefore, systems and methods of the present disclosure significantly increase the accuracy of FDD systems by applying an ensemble of detectors. Specifically, instead of using a single parameter value, the systems and methods of the present disclosure use multiple parameter values and/or multiple models in parallel to significantly improve the robustness of fault determinations and reduce the sensitivity to individual parameter values. Furthermore, in various embodiments, systems and methods of the present disclosure facilitate fault confidence determinations. For example, instead of determining a fault as a binary (e.g., fault/no-fault), systems and methods of the present disclosure may facilitate determining a fault as a continuous value (e.g., 10% confidence in fault, 70% confidence in fault, etc.).

The FDD system described herein improves FDD technology and the field of fault detection generally by significantly improving the robustness of fault determinations. Furthermore, the FDD system described herein conserves personnel and computing resources by reducing or eliminating false alarms (e.g., false positive fault indications). Traditional FDD systems may generate a large number of false positives (e.g., causing alarm fatigue, etc.) that mask legitimate fault determinations and reduce FDD utility to a user. Furthermore, the large number of false positives associated with a traditional FDD system may require investigation by a user. Therefore, the FDD system described herein conserves personnel and computing resources by reducing false positives, thereby reducing user investigation. Additionally, the FDD system described herein reduces the number of false positives that mask legitimate fault determinations, thereby surfacing information to users that is otherwise unavailable (e.g., because of alarm fatigue, etc.). Furthermore, the FDD system described herein may determine a fault as a continuous value, further providing additional information to a user that is otherwise unavailable in traditional FDD systems (e.g., FDD systems that determine a fault as a binary). Traditional FDD systems may require huge datasets to develop models to determine accurate individual parameters. For example, a FDD system applied to a HVAC system in a building with a highly inconsistent environment (e.g., a lobby with an erratic temperature based on people coming and going, etc.) may require an immense dataset to generate a model capable of producing parameter values of any utility (e.g., parameter values that do not result in a high number of false positives or false negatives, etc.). However, the FDD system described herein is relatively insensitive to individual parameter values, therefore the FDD system described herein conserves computing resources by reducing or eliminating elaborate model generation and thereby reducing computing resources dedicated to processing large datasets.

Figure 6:
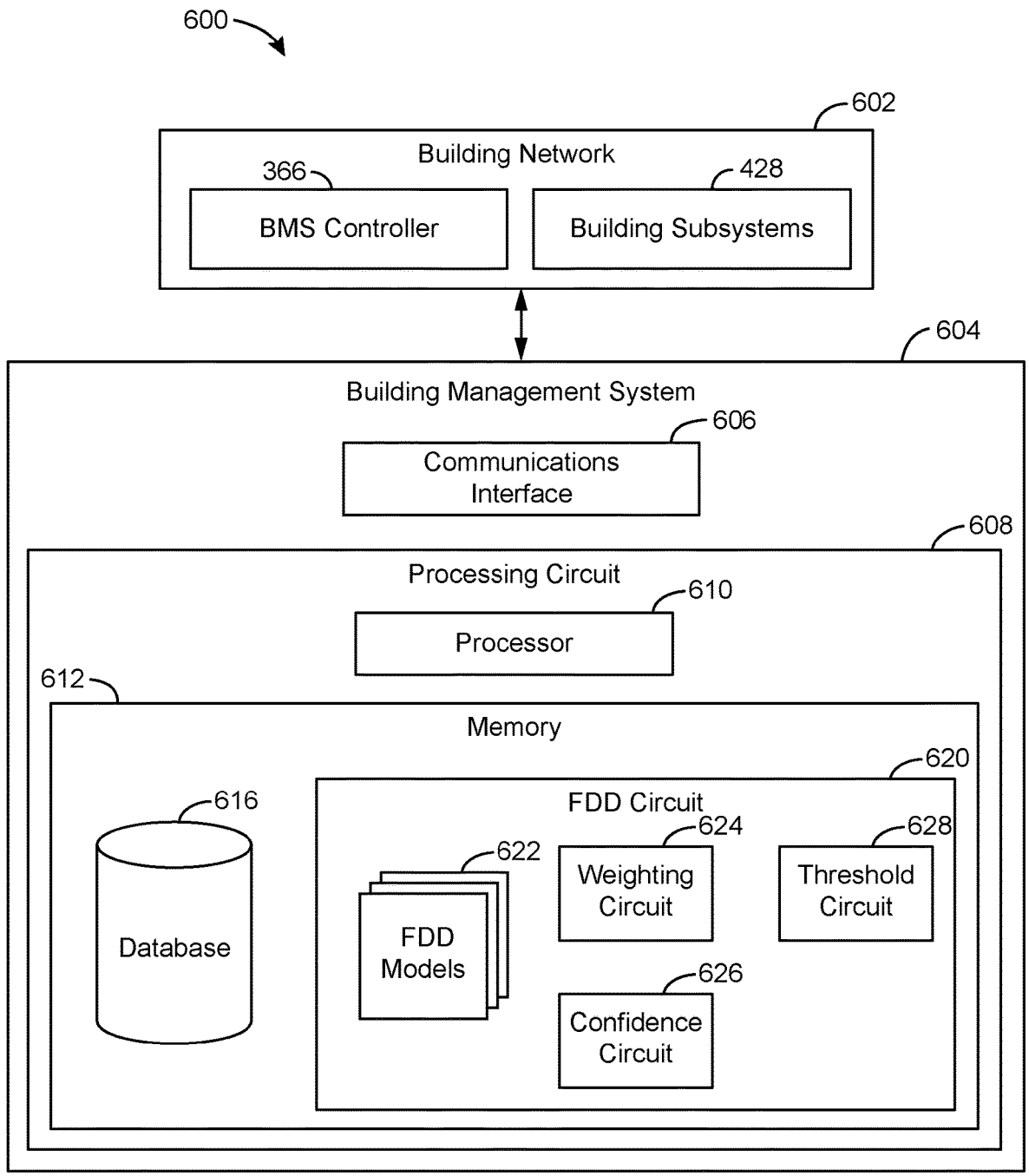
FIG. 6 is a block diagram of a fault detection and diagnosis (FDD) system that can be used to monitor a component and/or system, according to an exemplary embodiment.

Referring now to FIG. 6, a system 600 including a building management system 604 in communication with a building network 602 is shown, according to an exemplary embodiment. Building network 602 may include BMS 400 (e.g., BMS controller 366, building subsystems 428, etc.) and/or any items (e.g., spaces, equipment, objects, points, etc.) of a building that building management system 604 is associated with. Building management system 604 may be configured to provide various reporting capabilities regarding the items and/or facilitate providing commands (e.g., bulk commands, individual commands, etc.) to one or more of the entities (e.g., building equipment, control objects, control points, etc.) connected therewith.

Building management system 604 includes a communications interface 606 and a processing circuit 608 having a processor 610 and a memory 612. Processing circuit 608 can be communicably connected to communications interface 606 such that processing circuit 608 and the various components thereof can send and receive data via communications interface 606 (e.g., to/from building network 602, etc.). Processor 610 can be implemented as a general purpose processor, an application specific integrated circuit (ASIC), one or more field programmable gate arrays (FPGAs), a group of processing components, or other suitable electronic processing components.

Memory 612 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 612 can be or include volatile memory or non-volatile memory. Memory 612 can include database components, object code components, script components, or any other type of information structure for supporting the various activities and information structures described in the present application. According to an example embodiment, memory 612 is communicably connected to processor 610 via processing circuit 608 and includes computer code for executing (e.g., by processing circuit 608 and/or processor 610) one or more processes described herein. In some embodiments, building management system 604 is implemented within a single computer (e.g., one server, one housing, etc.). In various other embodiments, building management system 604 can be distributed across multiple servers or computers (e.g., that can exist in distributed locations).

Still referring to FIG. 6, memory 612 is shown to include database 616 and FDD circuit 620. Database 616 is configured to store data collected from a component/system under observation. For example, FDD circuit 620 may be applied to building management system 602 and database 616 may store data collected from buildings and building management system devices. As a further example, FDD circuit 620 may be applied to a CCTV network and database 616 may store data collected from CCTV devices (e.g., cameras, controllers, etc.). In some embodiments, the data is time-series data. In various embodiments, the data relates to operation of building 10 and/or BMS 400. For example, database 616 may include sensor data describing a state of building 10. Database 616 may be a graph database, MySQL, Oracle, Microsoft SQL, Postgre DB2, document store, search engine, key-value store, etc. In some embodiments, database 616 is organized into sections. Each section can represent inputs received from a specific sensor or building management system device. For example, database 616 may include a timeseries including electrical usage data samples of different building management system devices. Database 616 may store the electrical usage data samples in a column with different data entries associated with times the temperature inputs were taken for each row. Each column in database 616 may represent a different sensor within the building management system devices while each row can represent different time stamps representing the time and date the data was received or the time a sensor sensed the data.

FDD circuit 620 may include a number of FDD models 622, weighting circuit 624, confidence circuit 626, and threshold circuit 628. While FDD circuit 620 is described in reference to building management system 604, it should be understood that FDD circuit 620 may be implemented in any system. For example, FDD circuit 620 may be implemented in a computer network to determine faults related to computer hardware functioning. FDD models 622 may be configured to receive input data and produce a fault determination. In some embodiments, FDD models 622 may be configured to produce a fault confidence. Each of FDD models 622 may include parameters. For example, a first FDD model 622 may include a first parameter associated with a temperature threshold and a second FDD model 622 may include a second parameter associated with a humidity threshold. In various embodiments, the parameters are unique to each FDD model 622. Additionally or alternatively, FDD models 622 may share one or more parameters. FDD models 622 may be generated based on training data. For example, FDD models 622 may represent a normal state of the observed system (e.g., building 10, etc.). In various embodiments, each of FDD models 622 are focused on detecting a different class of faults and/or analyzing a different aspect of the observed system. FDD models 622 may receive input data (e.g., sensor signals from building 10, computer network traffic, etc.) and generate a fault determination (e.g., fault/no-fault, etc.). FDD models 622 may include Bayesian models, deep neural network models (e.g., convolutional neural networks, etc.), spectral analysis systems, principal component analysis systems, AutoEncoder systems, prediction models, One-Class SVM systems, isolated forest trees, and/or any other model. In various embodiments, FDD models 622 are configured to constrain outputs. For example, FDD models 622 may generate outputs in a standardized form (e.g., binary outputs, continuous outputs between [0, 1], etc.). In some embodiments, FDD models 622 may generate outputs in a non-standardized form and FDD circuit 620 may normalize the outputs. For example, a first FDD model 622 may generate a continuous output between [0, 1] and a second FDD model 622 may generate a continuous output between [0, 100]. FDD circuit 620 may normalize the outputs to a standardized binary form. Normalization may include applying a moving window average, statistical analysis, and/or any other normalization technique.

Weighting circuit 624 may receive the fault determinations from FDD models 622 and apply various weights to the fault determinations. For example, a first fault determination received from a first FDD model may be assigned a weight of 0.2 while a second fault determination received from a second FDD model may be assigned a weight of 0.8. The weights assigned to each FDD model 622 output (e.g., fault determination, etc.) may be predetermined. For example, the weights may be determined based on machine learning. As a concrete example, FDD circuit 620 may be trained with a training dataset to determine the weight associated with each of FDD models 622. Additionally or alternatively, the weights may be determined dynamically. For example, the weights may be determined based on a rules engine. As a further example, the weights may be determined based on user input (e.g., a rule-based expert system, etc.). In various embodiments, the weights sum to 1.0. In various embodiments, weighting circuit 624 generates a sum of the weighted fault determinations. The sum of the weighted fault determinations may be a fault score.

Confidence circuit 626 may receive the outputs from FDD models 622 and determine a fault confidence. In some embodiments, confidence circuit 626 receives a fault confidence from each of FDD models 622 and determines an aggregate fault confidence. Additionally or alternatively, confidence circuit 626 may receive fault determinations from FDD models 622 and determine a fault confidence based on the received fault determinations. The fault confidence may represent a confidence in the accuracy of the fault determination. For example, a fault confidence of 80% may correspond to an 80% confidence that the determined fault is accurate (e.g., not a false positive or false negative, etc.). Additionally or alternatively, the fault confidence may be associated with the accuracy of the fault determination. For example, a fault confidence of 80% may indicate that 80% of previous faults having similar characteristics were determined to be accurate faults. Determining a fault confidence is described in greater detail below with reference to FIG. 8.

Threshold circuit 628 may receive the fault determinations from FDD models 622 and analyze the received fault determinations to generate an aggregate fault determination. In some embodiments, the aggregate fault determination is a composite of the individual fault determinations. In various embodiments, threshold circuit 628 receives a fault score from weighting circuit 624. Threshold circuit 628 may compare the fault score to a threshold to generate a fault determination. In some embodiments, threshold circuit 628 includes a fault confidence when generating a fault confidence. For example, threshold circuit 628 may compare a fault confidence associated with a fault score to determine if the fault score corresponds to a legitimate fault. As a concrete example, threshold circuit 628 may determine that a fault confidence of 80% is greater than a threshold of 75% and therefore an associated fault score represents a legitimate fault. In some embodiments, threshold circuit 628 generates a fault determination based on multiple factors. As a concrete example, threshold circuit 628 may (i) compare a fault score to a fault threshold, (ii) compare a time associated with each of the outputs from FDD models 622, and (iii) based on (i) and (ii) generate a fault determination. Additionally or alternatively, threshold circuit 628 may include different factors (e.g., thresholds, etc.) based on the class of fault. Thresholds may be predetermined. For example, a threshold may be determined based on machine learning. As a concrete example, threshold circuit 628 may be trained with a training dataset to determine a threshold that produces accurate fault determinations. Additionally or alternatively, thresholds may be determined dynamically. For example, a threshold may be determined based on a rules engine. In some embodiments, threshold circuit 628 includes a number of rules to facilitate generation of fault determinations. As a further example, a threshold may be determined based on user input (e.g., a rule-based expert system, etc.). Generation of fault determinations is discussed in greater detail below with reference to FIG. 7.

Figure 7:
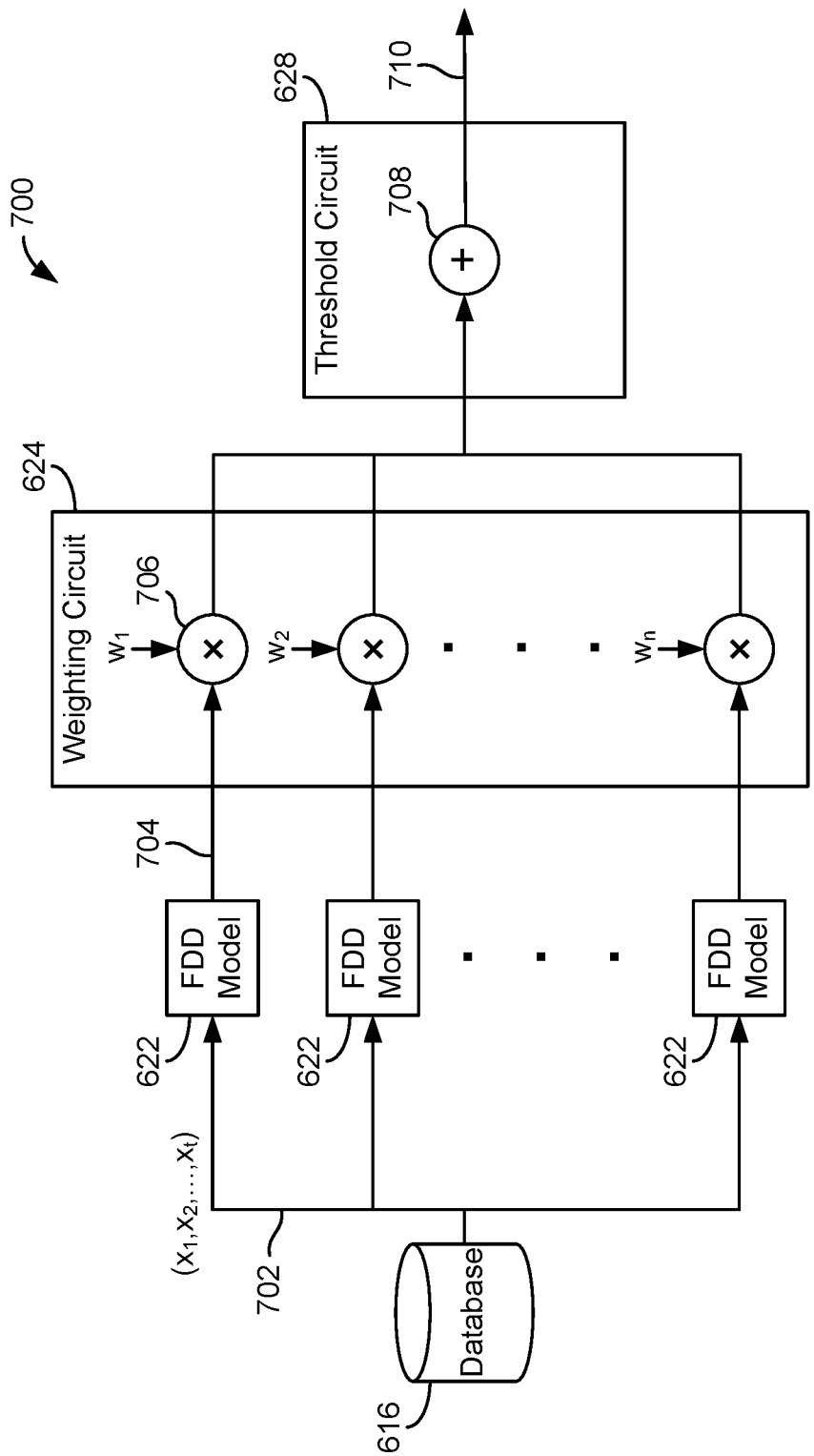
FIG. 7 is a data flow diagram of the FDD system of FIG. 6 generating a fault determination, according to an exemplary embodiment.

Referring now to FIG. 7, a signal flow diagram illustrating a process 700 for generating a fault determination is shown, according to an exemplary embodiment. At step 702, FDD models 622 may receive input data from database 616. Additionally or alternatively, FDD models 622 may receive input data from an observed system. For example, FDD models 622 may receive input data from building 10 and/or BMS 400. The input data may be sensor data. For example, the input data may be timeseries sensor values. In some embodiments, the input data is vectored. For example, input data may take the form $x_1, x_2, \ldots, x_t$ where each of $x_i$ has d components such that $x_i \in \mathcal{R}^d$ for $i=x_1, x_2, \ldots, x_t$. In some embodiments, the input data is multi-variate. For example, a vector index may be associated with a time and a vector value may be associated with a measured value. As a concrete example, a two-dimensional vector such that $x_i \in \mathcal{R}^2$ may include room temperature measurements and energy consumption measurements.

At step 704, FDD models 622 may generate individual fault determinations based on the received input data. Process 700 may include any number of FDD models 622. In various embodiments, the individual fault determinations are binary (e.g., fault/no-fault, etc.). In some embodiments, FDD models 622 are chosen from a candidate set of FDD models. For example, FDD circuit 620 may evaluate m candidate FDD models and select n models as the FDD models 622 based on which of the m candidate FDD models performed the best (e.g., had the highest fault determination accuracy, lowest number of false fault determinations, etc.). In some embodiments, m>>n. In various embodiments, each of the n FDD models 622 includes parameters $\Phi_{1,1}, \Phi_{1,2}, \ldots, \Phi_{1,\alpha}$ where $\alpha$ is the number of parameters associated with the first FDD model 622. As a concrete example, the parameters $\Phi_{1,1}, \Phi_{1,2}, \ldots, \Phi_{1,\alpha}$ may include a window size, a threshold value, and/or any other parameters. In some embodiments, different FDD models 622 include a different number of parameters.

At step 706, weighting circuit 624 may apply a weight to each of the individual fault determinations generated by FDD models 622. In various embodiments, there are n fault determinations, each corresponding to one of FDD models 622. Weighting circuit 624 may apply weights $w_1, w_2, \ldots, w_n$ to the n fault determinations. In some embodiments, the weights $w_1, w_2, \ldots, w_n$ are predetermined. For example, FDD circuit 620 may generate weights $w_1, w_2, \ldots, w_n$ using a machine learning algorithm. Additionally or alternatively, the weights $w_1, w_2, \ldots, w_n$ may be determined dynamically. For example, FDD circuit 620 may receive weights $w_1, w_2, \ldots, w_n$ from an external distributed processing system based on the specific FDD models 622 being used. As a concrete example, weights $w_1, w_2, \ldots, w_n$ may be determined by testing a number of candidate weights and selecting the weights that perform the best (e.g., have the highest fault determination accuracy, the lowest number of false fault determinations, etc.) over a training data set. In various embodiments, the weights $w_1, w_2, \ldots, w_n$ are configured such that:

$$\sum_{i=1}^{n} w_i = 1$$

At step 708, threshold circuit 628 may sum the n weighted fault determinations. For example, threshold circuit 628 may sum the n weighted fault determinations to produce a fault score:

$$\varphi = \sum_{i=1}^{n} w_i f(x_1, x_2, \ldots, x_t; \Phi_{i,\alpha})$$

where φ is the fault score and $w_i f(x_1, x_2, \ldots, x_t; \Phi_{i,\alpha})$ is the weighted fault determination of the $i^{th}$ FDD model 622.

At step 710, threshold circuit 628 compares the fault score φ to a threshold to generate a fault determination. For example, threshold circuit 628 may evaluate:

if(φ≥T)→fault where T is a threshold value. In various embodiments, the fault score φ is a numerical value. In some embodiments, threshold circuit 628 determines a fault exists (e.g., there is a fault, etc.) if the fault score φ exceeds the threshold T. For example, threshold circuit 628 may compare φ=0.4 to T=0.5 to determine a fault does not exist. Additionally or alternatively, threshold circuit 628 may determine a fault exists if the fault score φ is less than the threshold T. It should be understood that mathematically comparable operations may also be used (e.g., comparing ratios, etc.). In various embodiments, FDD circuit 620 sends an indication of the fault based on the determination of threshold circuit 628. For example, FDD circuit 620 may send a notification to an operator of BMS 400.

Figure 8:
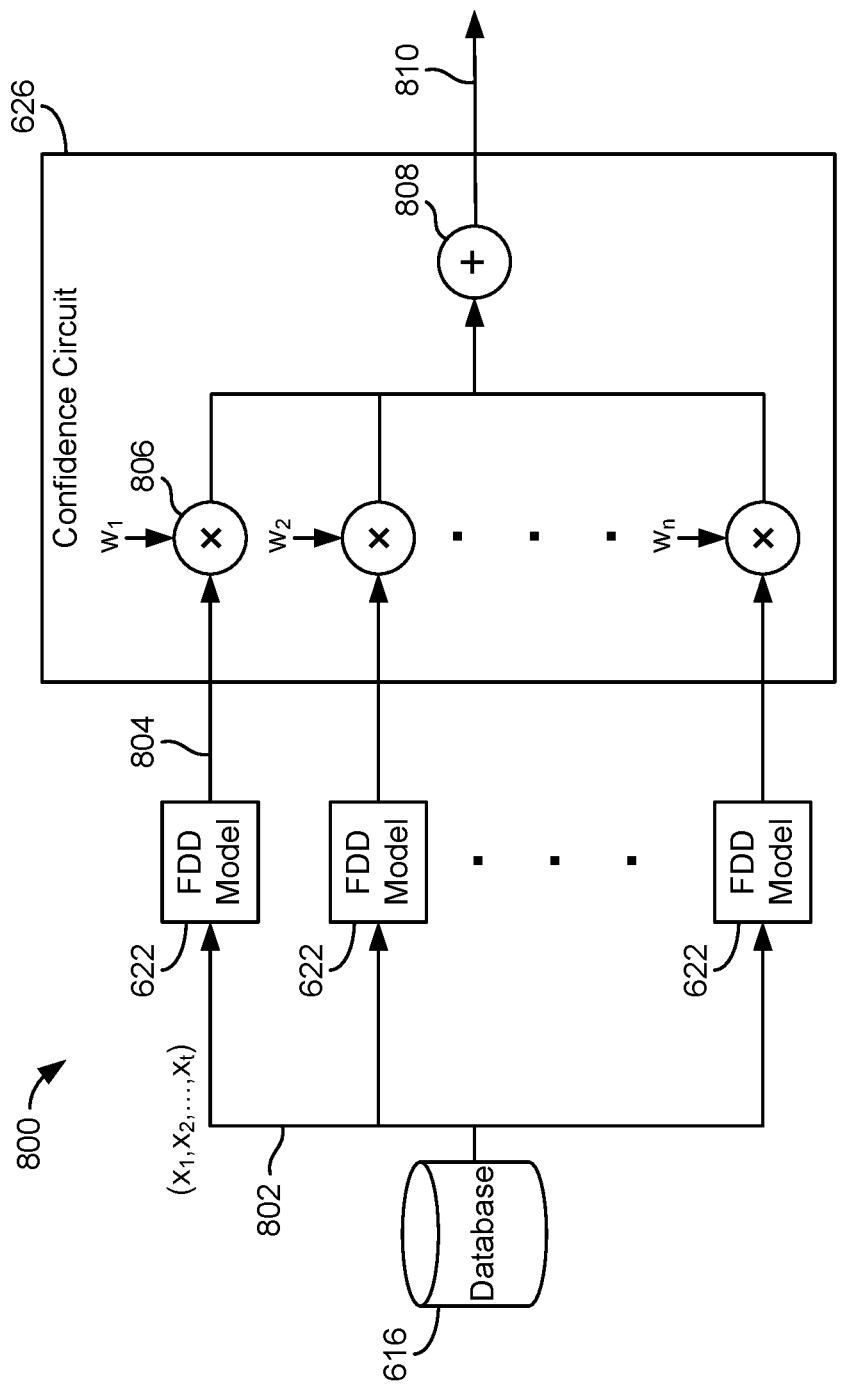
FIG. 8 is a data flow diagram of the FDD system of FIG. 6 generating a fault confidence, according to an exemplary embodiment.

Referring now to FIG. 8, a signal flow diagram illustrating a process 800 for generating a fault confidence is shown, according to an exemplary embodiment. At step 802, FDD models 622 may receive input data from database 616. In various embodiments, the input data takes the form of $x_1$, $x_2, \ldots, x_t$ as described above with reference to FIG. 7. In various embodiments, the input $x_1, x_2, \ldots, x_t$ is the same input described above in reference to FIG. 7. Additionally or alternatively, the input $x_1, x_2, \ldots, x_t$ may be different input. At step 804, FDD models 622 may generate individual fault determinations based on the received input data. Additionally or alternatively, FDD models 622 may generate individual fault confidences. For example, a first FDD model 622 may generate a first fault confidence associated with a first fault determination and a second FDD model 622 may generate a second fault confidence associated with a second fault determination. In some embodiments, the FDD models 622 are the same FDD models described above in reference to FIG. 7. Additionally or alternatively, the FDD models 622 may be different FDD models. For example, process 700 may include a first set of FDD models 622 and process 800 may include a second set of FDD models 622. As a concrete example, the FDD models 622 of process 800 may be tailored to generating fault confidences while the FDD models 622 of process 700 may be tailored to generating fault determinations.

At step 806, confidence circuit 626 may apply a weight to each of the individual fault determinations generated by FDD models 622. Additionally or alternatively, confidence circuit 626 may apply a weight to each of the individual fault confidences generated by FDD models 622. In various embodiments, the weights applied at step 806 are numerically different than the weights referenced in FIG. 7. At step 808, confidence circuit 626 may sum the weighted fault determinations and generate an aggregate fault confidence. For example, confidence circuit 626 may perform:

$$\text{confidence} = \sum_{i=1}^{n} w_i f(x_1, x_2, \ldots, x_t; \Phi_{i,\alpha})$$

where $w_i f(x_1, x_2, \ldots, x_t; \Phi_{i,\alpha})$ is the weighted fault determination of the $i^{th}$ FDD model 622. Additionally or alternatively, confidence circuit 626 may sum the weighted fault confidences and generate an aggregate fault confidence. For example, confidence circuit 626 may perform:

$$\text{confidence} = \sum_{i=1}^{n} w_i h(x_1, x_2, \ldots, x_t; \Phi_{i,\alpha})$$

where $w_i h(x_1, x_2, \ldots, x_t; \Phi_{i,\alpha})$ is the weighted fault confidence of the $i^{th}$ FDD model 622. At step 810, confidence circuit 626 outputs a fault confidence based on the confidence determined in step 808. In various embodiments, the fault confidence is a percentage. In some embodiments, the fault confidence is an indicator (e.g., a color, a symbol, etc.). In some embodiments, step 810 includes transmitting an indication of the fault confidence. For example, FDD circuit 620 may send a notification including the fault confidence to an operator of BMS 400.

Figure 9:
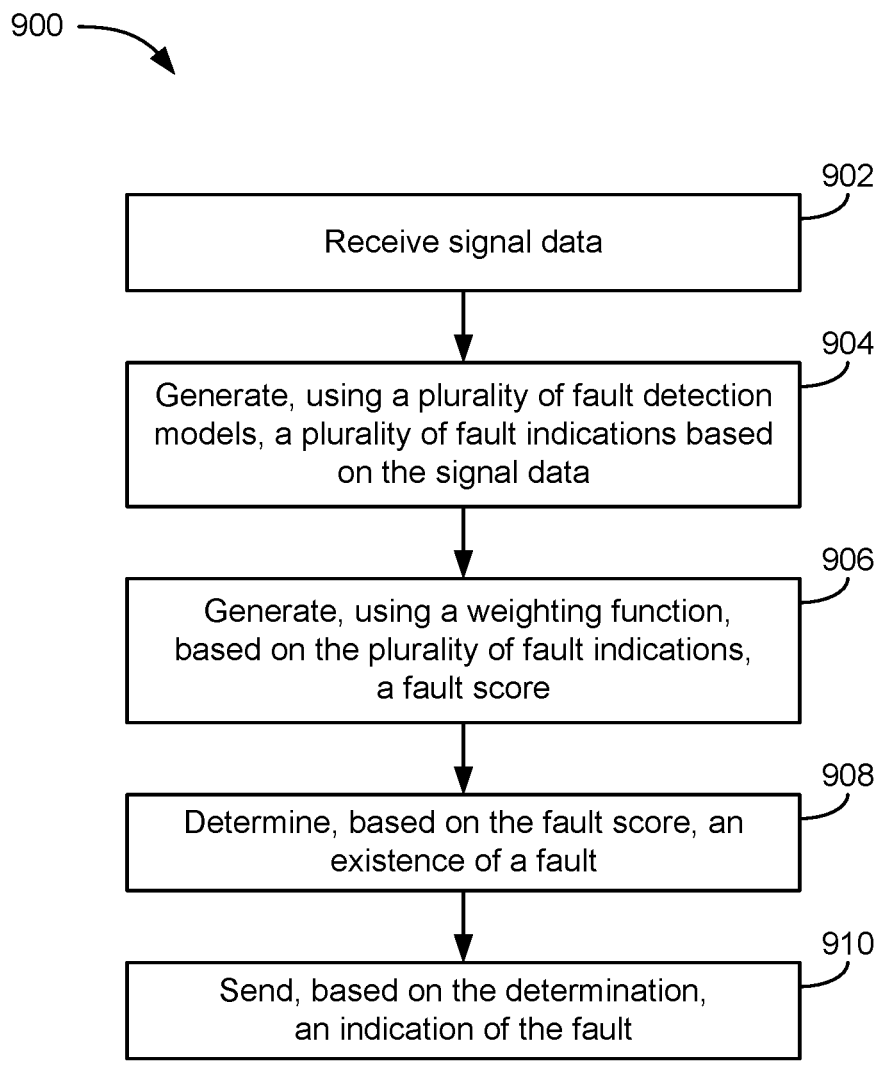
FIG. 9 is a flow diagram of a process of determining a fault using the FDD system of FIG. 6, according to an exemplary embodiment.

Referring now to FIG. 9, a process 900 for generating a fault determination is shown, according to an embodiment. At step 902, FDD circuit 620 receives signal data. In various embodiments, the signal data is sensor measurements. For example, the signal data may include an AHU valve position. In various embodiments, the signal data is vectored data as described above. At step 904, FDD circuit 620, using a number of FDD models 622, generates a number of fault indications (e.g., fault/no-fault, etc.) based on the received signal data. Additionally or alternatively, FDD models 622 may generate a specific fault property. For example, fault properties may include a time-of-onset of a fault, a cause of a fault, a fault severity, a risk of system shutdown, an estimation of remaining system lifetime, and/or any other system property. As a concrete example, an FDD model 622 may determine that a fault exists and further determine an individual estimate of a time-of-onset of the fault.

At step 906, weighting circuit 624 may generate, using a weighting function, a fault score based on the number of fault indications. For example, weighting circuit 624 may apply weights as described above in reference to FIG. 7. Additionally or alternatively, weighting circuit 624 may generate a probability score (e.g., a probability that the specific fault property has a specific value y). As a non-limiting example, weighting circuit 624 may implement the function:

$$P(\text{property} = y) = \sum_{i=1}^{n} w_i 1_{y_i=y}$$

where P is the probability that the specific fault property has the specific value y and $1_{y_i=y}$ is an indicator function such that $$P(\text{property} = y) = \sum_{i=1}^{n} w_i p_i y_i$$

Additionally or alternatively, weighting circuit 624 may implement the function:

$$1_{y_i=y} \xrightarrow{y_i=y} 1 \text{ and } 1_{y_i=y} \xrightarrow{y_i \neq y} 0.$$

where $y_i$ is the individual estimated value of the specific fault property produced by the $i^{th}$ FDD model 622 and $p_1$ is the estimated probability of the specific fault property produced by the $i^{th}$ FDD model 622. In some embodiments, the fault score includes P.

At step 908, threshold circuit 628 determines, based on the fault score an existence of a fault. In various embodiments, step 908 includes comparing the fault score to a threshold as described in above in reference to FIG. 7. Additionally or alternatively, step 908 may include determining a specific fault property based on the individual estimated values of the specific fault property. For example, threshold circuit 628 may generate a value of the specific fault property based on a consensus of the individual estimates. In some embodiments, threshold circuit 628 generates the value of the specific fault property based on the individual estimate having the highest probability P. In some embodiments, threshold circuit 624 generates the probability that the value of the specific fault property is at least a threshold value. For example, threshold circuit 624 may implement the function:

$$P(\text{property} \geq y) = \sum_{i=1}^{n} w_i p_i 1_{y_i \geq y}$$

At step 910, FDD circuit 620 sends an indication of the fault based on the determination (e.g., step 908). For example, FDD circuit 620 may send a notification describing the fault and the specific fault property. As a concrete example, FDD circuit 620 may send a push notification to an operator of BMS 400 describing a detected fault and a time-of-onset of the fault.

Figure 10:
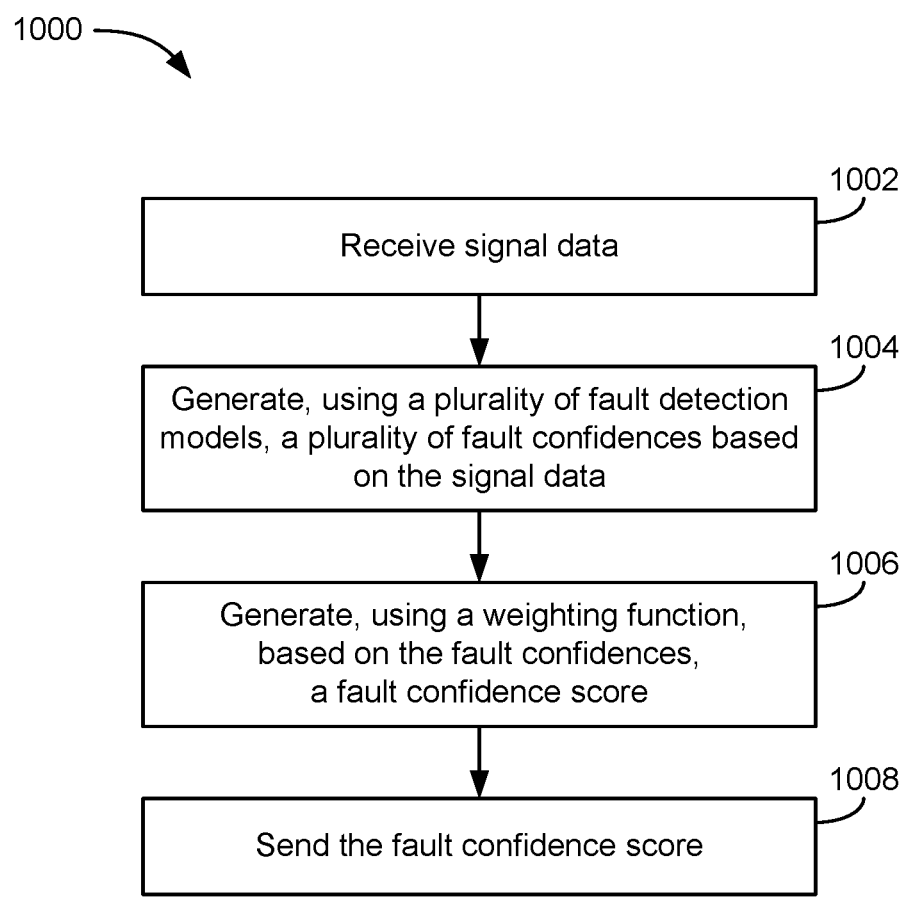
FIG. 10 is a flow diagram of a process of determining a fault confidence using the FDD system of FIG. 6, according to an exemplary embodiment.

Referring now to FIG. 10, a process 1000 for generating a fault confidence is shown, according to an embodiment. At step 1002, FDD circuit 620 receives signal data. In various embodiments, the signal data is sensor measurements. In some embodiments, the signal data is the same as the signal data of process 900. At step 1004, FDD circuit 620, using a number of FDD models 622, generates a number of fault confidences based on the signal data. In some embodiments, the fault confidences are confidence intervals (e.g., ranges, etc.). At step 1006, confidence circuit 626 generates a fault confidence based on the number of fault confidences generated by FDD models 622. In some embodiments, step 1006 includes applying a weighting function as described above in reference to FIG. 8. Additionally or alternatively, step 1006 may include summing the individual fault confidences generated by FDD models 622. For example, confidence circuit 626 may apply a weight to the individual fault confidences and then may sum the weighted individual fault confidences to produce the fault confidence. In some embodiments, the fault confidence is a numeric value (e.g., a fault confidence score, etc.). Additionally or alternatively, the fault confidence may take other representations (e.g., colors, symbols, etc.). At step 1008, confidence circuit 626 transmits the fault confidence. For example, confidence circuit 626 may transmit a notification to an operator of BMS 400 indicating the existence of a fault and the confidence of the fault determination.

A non-limiting example is as follows: FDD circuit 620 may receive data from a HVAC system associated with a monitored room. For example, FDD circuit 620 may receive room temperature measurements and energy consumption measurements in the form of a two-dimensional timeseries vector where each index represents a one-hour time step. The two-dimensional timeseries vector may take the form $x_i=(t_i, e_i)$ where $t_i$ is the temperature and $e_i$ is the energy consumption. FDD circuit 620 may be configured to detect a fault if either the temperature measurements or the energy consumption measurements exceed a threshold. The thresholds may be associated with a state of the monitored system. For example, a first set of thresholds may be associated with an occupied state of the monitored room and a second set of thresholds may be associated with an unoccupied state of the monitored room. For example, FDD circuit 620 may be configured to test the following conditions:

$(t_i > T_1$ OR $t_i < T_2$ OR $e_i > T_3)$ AND index i corresponds to an occupied state OR → fault $(t_i > T_4$ OR $t_i < T_5$ OR $e_i > T_6)$ AND index i corresponds to an unoccupied state where $T_1$-$T_6$ are threshold values set manually by a domain expert. Additionally or alternatively, $T_1$-$T_6$ may be determined automatically based on statistical methods. For example, $T_1$ and $T_3$ may be determined based on the 90% percentile of temperature and energy consumptions in an occupied state as indicated by historical data. Similarly, $T_2$ may be determined based on the 10% percentile of temperatures in an occupied state as indicated by historical data. Similarly, $T_4$, $T_5$, and $T_6$ may be determined based on historical data from an unoccupied state.

Another non-limiting example is as follows: FDD circuit 620 may receive data from a security system associated with a monitored premises. For example, FDD circuit 620 may receive a Gaussian distribution associated with the loitering time of individuals in a building lobby (e.g., how long an individual remained in the building lobby). FDD circuit 620 may further receive a single-dimensional vector $x_1$, $x_2, \ldots, x_t$. FDD circuit 620 may generate a model to determine a fault confidence associated with a fault determination. For example, FDD circuit 620 may analyse historical data $x'_1, x'_2, \ldots, x'_h$ to generate an FDD model 622 where h is the number of historical data elements. FDD circuit 620 may determine the fault confidence associated with an input vector x based on:

$$h(x; \mu, \Sigma) = 1 - \mathcal{N}(x; \mu, \Sigma)$$

where $h(x; \mu, \Sigma)$ is the fault confidence associated with the input vector x (e.g., the confidence that the new measurement corresponds to a fault in the observed system, etc.), and $\mathcal{N}(x; \mu, \Sigma)$ is the normal distribution based on estimated parameters:

$$\mathcal{N}(x; \mu, \Sigma) = \frac{\exp\left(-\frac{1}{2}(x-\mu)^t \Sigma^{-1}(x-\mu)\right)}{\sqrt{(2\pi)^d |\Sigma|}}$$

where $\mu$ is the mean of the Gaussian distribution, $\Sigma$ is the covariance of the Gaussian distribution, and d is the dimension of the input vector x. Accordingly, each FDD model 622 may generate a fault confidence and confidence circuit 626 may analyse the individual fault confidences to generate a fault confidence as described above with reference to FIG. 8. As a concrete example, a first prediction based FDD model 622 may generate a model based on the input vector x and/or historical input data. The first prediction based FDD model 622 may generate predictions of expected next normal observations. For example, for a room temperature at a steady state 70° F., the first prediction based FDD model 622 may generate predictions of next temperature measurements around 70° F. The first prediction based FDD model 622 may compare the predictions to the actual observed value to determine a result (e.g., a difference, etc.). Based on the result, the first prediction based FDD model 622 may generate a binary fault output. For example, the first prediction based FDD model 622 may generate a fault indication if the result exceeds a threshold. As a further example, a second deep neural network FDD model 622 may generate a model based on the input vector x and/or historical input data. The second deep neural network FDD model 622 may pass the input vector x through a number of layers of the model and generate a binary fault output.

Additionally or alternatively, the input vector $x_1, x_2, \ldots, x_t$ may be a multi-variate timeseries vector. Confidence circuit 626 may then implement the function:

$$h(x_1, \ldots, x_t; \mu, \Sigma) = \max_{i=1,\ldots,t} h(x_i; \mu, \Sigma)$$

where $h(x_1, \ldots, x_t; \mu, \Sigma)$ is the fault confidence associated with the multivariate timeseries input vector $x_1, \ldots, x_t$. In various embodiments, $h(x_1, \ldots, x_t; \mu, \Sigma)$ is associated with the probability of a fault. In various embodiments, the probability of fault is in the interval [0,1]. Similarly as above, each FDD model 622 may generate a fault confidence and confidence circuit 626 may analyze the individual fault confidences to generate a fault confidence as described above with reference to FIG. 8.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of generating a fault determination in a building management system (BMS), the method comprising:
   receiving signal data;
   generating, using a plurality of fault detection models, a plurality of fault indications based on the signal data, each of the plurality of fault detection models configured to detect a respective class of fault and each of the plurality of fault indications indicating whether the respective class of fault is detected, each of the plurality of fault indications comprising a respective estimated severity of a potential fault;
   generating a fault score by applying a plurality of weight values to the plurality of fault indications generated using the plurality of fault detection models;
   comparing the fault score to a fault value;
   determining, based on the comparison, an existence of a fault in the BMS;
   determining, based on the respective estimated severity of each of the plurality of fault indications, an estimated severity of the fault in the BMS; and
   executing, by the BMS, an automatic control operation based on the estimated severity in response to determining the existence of the fault.

2. The method of claim 1, wherein the fault score indicates a level of confidence that the fault exists.

3. The method of claim 1, wherein the fault score indicates the probability that a parameter of the building management system (BMS) has a specific value.

4. The method of claim 3, wherein generating the fault score further includes generating a fault confidence based on the plurality of fault indications, wherein the fault confidence indicates a level of confidence that the fault exists.

5. The method of claim 4, wherein generating the plurality of fault indications further includes generating, by each of the plurality of fault detection models, an individual fault confidence based on the signal data.

6. The method of claim 5, wherein generating the fault confidence includes applying a second plurality of weight values to the plurality of individual fault confidences based on the probability that the parameter of the building management system (BMS) has the specific value.

7. The method of claim 1, wherein the signal data is timeseries data.

8. The method of claim 1, the method further including, in response to determining the existence of the fault, sending an indication of the fault to a building management system (BMS) operator.

9. The method of claim 1, wherein a first subset of one or more of the plurality of fault detection models is associated with detecting a first class of fault and a second subset of one or more of the plurality of fault detection models is associated with detecting a second class of fault.

10. The method of claim 9, wherein generating the plurality of fault indications comprises generating, by the first subset of fault detection models, a first fault indication of the plurality of fault indications using a first subset of the signal data associated with a first component of the BMS and generating, by the second subset of fault detection models, a second fault indication of the plurality of fault indications using a second subset of the signal data associated with a second component of the BMS.

11. A building management system (BMS), comprising:
a processing circuit including a processor and memory, the memory having instructions stored thereon that, when executed by the processor, cause the processing circuit to:
receive signal data;
generate, using a plurality of fault detection models, a plurality of fault indications based on the signal data, each of the plurality of fault detection models configured to detect a respective class of fault and each of the plurality of fault indications indicating whether the respective class of fault is detected, each of the plurality of fault indications comprising a respective estimated severity of a potential fault;
generate a fault score by applying a plurality of weight values to the plurality of fault indications generated using the plurality of fault detection models;
compare the fault score to a fault value;
determine, based on the comparison, an existence of a fault in the BMS;
determine, based on the respective estimated severity of each of the plurality of fault indications, an estimated severity of the fault in the BMS; and
execute an automatic control operation based on the estimated severity in response to determining the existence of the fault, the automatic control operation executed by the BMS.

12. The building management system (BMS) of claim 11, wherein the fault score indicates a level of confidence that the fault exists.

13. The building management system (BMS) of claim 11, wherein the fault score indicates the probability that a parameter of the BMS has a specific value.

14. The building management system (BMS) of claim 13, wherein generating the fault score further includes generating a fault confidence based on the plurality of fault indications, wherein the fault confidence indicates a level of confidence that the fault exists.

15. The building management system (BMS) of claim 14, wherein generating the plurality of fault indications further includes generating, by each of the plurality of fault detection models, an individual fault confidence based on the signal data.

16. The building management system (BMS) of claim 15, wherein generating the fault confidence includes applying a second plurality of weight values to the plurality of individual fault confidences based on the probability that the parameter of the BMS has the specific value.

17. The building management system (BMS) of claim 11, wherein the signal data is timeseries data.

18. The building management system (BMS) of claim 11, the processing circuit further configured to, in response to determining the existence of the fault, send an indication of the fault to a BMS operator.

19. The building management system (BMS) of claim 11, wherein a first subset of the plurality of fault detection models is associated with detecting a first class of fault and a second subset of the plurality of fault detection models is associated with detecting a second class of fault.

20. The building management system (BMS) of claim 19, wherein generating the plurality of fault indications comprises generating, by the first subset of fault detection models, a first fault indication of the plurality of fault indications using a first subset of the signal data associated with a first component of the BMS and generating, by the second subset of fault detection models, a second fault indication of the plurality of fault indications using a second subset of the signal data associated with a second component of the BMS.

21. A non-transitory computer-readable storage medium having instructions stored thereon that, when executed by a processor of a building management system (BMS), cause the processor to:
receive signal data;
generate, using a plurality of fault detection models, a plurality of fault indications based on the signal data, each of the plurality of fault detection models configured to detect a respective class of fault and each of the plurality of fault indications indicating whether the respective class of fault is detected, wherein a first subset of one or more of the plurality of fault detection models is associated with detecting a first class of fault and a second subset of one or more of the plurality of fault detection models is associated with detecting a second class of fault, each of the plurality of fault indications comprising a respective estimated severity of a potential fault;
wherein generating the plurality of fault indications comprises generating, by the first subset of fault detection models, a first fault indication of the plurality of fault indications using a first subset of the signal data associated with a first component and generating, by the second subset of fault detection models, a second fault indication of the plurality of fault indications using a second subset of the signal data associated with a second component;
generate a fault score by applying a plurality of weight values to the plurality of fault indications generated using the plurality of fault detection models;
compare the fault score to a fault value;
determine, based on the comparison, an existence of a fault;
determine, based on the respective estimated severity of each of the plurality of fault indications, an estimated severity of the fault in the BMS; and execute an automatic control operation based on the estimated severity in response to determining the existence of the fault, the automatic control operation executed by the BMS.

22. The non-transitory computer-readable storage medium of claim 21, wherein the fault score indicates a level of confidence that the fault exists.

23. The non-transitory computer-readable storage medium of claim 21, wherein the fault score indicates the probability that a parameter associated with a system including the first and second components has a specific value.

24. The non-transitory computer-readable storage medium of claim 23, wherein generating the fault score further includes generating a fault confidence based on the plurality of fault indications, wherein the fault confidence indicates a level of confidence that the fault exists.

25. The non-transitory computer-readable storage medium of claim 24, wherein generating the plurality of fault indications further includes generating, by each of the plurality of fault detection models, an individual fault confidence based on the signal data.

26. The non-transitory computer-readable storage medium of claim 25, wherein generating the fault confidence includes applying a second plurality of weight values to the plurality of individual fault confidences based on the probability that the parameter of the system has the specific value.

27. The non-transitory computer-readable storage medium of claim 21, wherein the signal data is timeseries data.

28. The non-transitory computer-readable storage medium of claim 21, the method further including, in response to determining the existence of the fault, sending an indication of the fault to an operator associated with a system including the first and second components.

* * * * *